(12) United States Patent
Yamazaki et al.

(10) Patent No.: US 8,087,693 B2
(45) Date of Patent: Jan. 3, 2012

(54) GAS GENERATOR

(75) Inventors: Masayuki Yamazaki, Hyogo (JP); Teppei Hanano, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 174 days.

(21) Appl. No.: 12/705,209

(22) Filed: Feb. 12, 2010

(65) Prior Publication Data

US 2010/0201111 A1   Aug. 12, 2010

Related U.S. Application Data

(60) Provisional application No. 61/152,460, filed on Feb. 13, 2009.

(30) Foreign Application Priority Data

Feb. 12, 2009 (JP) ................. 2009-029258

(51) Int. Cl.
*B60R 21/26* (2011.01)

(52) U.S. Cl. .................................... 280/741
(58) Field of Classification Search ............... 280/736, 280/737, 740, 741, 742; 102/530, 531
See application file for complete search history.

(56) References Cited

U.S. PATENT DOCUMENTS

| 5,675,102 | A | 10/1997 | Hamilton et al. | |
| 6,779,812 | B2* | 8/2004 | Ishida et al. | 280/741 |
| 7,390,019 | B2* | 6/2008 | Gotoh et al. | 280/741 |
| 2006/0273564 | A1* | 12/2006 | McCormick et al. | 280/740 |
| 2007/0001438 | A1* | 1/2007 | Patterson et al. | 280/740 |
| 2008/0078486 | A1 | 4/2008 | Khandhadia et al. | |

FOREIGN PATENT DOCUMENTS

| DE | 102 51 483 A1 | 5/2004 |
| EP | 1 769 980 A2 | 4/2007 |

* cited by examiner

*Primary Examiner* — Paul N Dickson
*Assistant Examiner* — Robert A Coker
(74) *Attorney, Agent, or Firm* — Birch, Stewart, Kolasch & Birch, LLP

(57) ABSTRACT

A cylindrical housing is mounted with an igniter and a diffuser portion having a gas discharge port. A cylindrical member is disposed and fixed in the housing so as to form a cylindrical gap reaching the gas discharge port. An obstacle is provided in the gap, and a first gas passage hole, a second gas passage hole and a third gas passage hole are formed. A gas generating agent is ignited and burnt by activation of the igniter to generate gas, part of the generated gas flows into the gap through the first gas passage hole (f1), part of the gas that has passed therethrough flows again into the cylindrical member through the second gas passage hole (f2) to aid the combustion of the gas generating agent, and then the gas flows into the gap through the third gas passage hole (f3) and finally is discharged from the gas discharge port.

4 Claims, 3 Drawing Sheets (a)  (b)

GAS GENERATOR

This nonprovisional application claims priority under 35 U.S.C. §119(a) on Patent Application No. 2009-29258 filed in Japan on 12 Feb. 2009 and 35 U.S.C. §119(e) on U.S. Provisional Application No. 61/152,460 filed on 13 Feb. 2009, which are incorporated by reference.

BACKGROUND OF THE INVENTION

1. Field of the Invention

The present invention relates to a gas generator that is installed on a vehicle and used in a restraining device such as an airbag system. More particularly, the present invention relates to a gas generator for use in an airbag system for side collision that inflates an airbag at the occupant side.

2. Description of Related Arts

Most gas generators for side airbags that protect occupants from side collisions are of thin elongated shape due to restrictions of the mounting location.

US-A No. 2008/0078486 discloses a gas generator in which an initiator 32 is accommodated at one end of an elongated outer housing 12, a diffuser portion having a gas discharge port 20 formed therein is provided at the opposite end, and no filter is used.

In such a gas generator, a booster cup 23 accommodating a booster agent and a partition 28 are disposed in the proximity of the initiator 32, and an opening 28a is provided in the partition 28. A gas generating material 16 is disposed inside a space formed by an inner housing 14.

The booster 24 burned by the initiator 32 generates combustion products that penetrate from the opening 28a into the inner housing 14 and burn the gas generating material 16. The gas generated from the gas generating material 16 passes through an orifice 18 of the inner housing 14, flows through a cylindrical gap between an outer housing 12 and the inner housing 14, and is discharged from a gas discharge port 20 of the diffuser portion.

SUMMARY OF THE INVENTION

The invention (I) provides
a gas generator including:
a cylindrical housing in which an ignition device is mounted on one end side and a diffuser portion having a gas discharge port is mounted on the other end side,
a cylindrical member disposed and fixed inside the cylindrical housing, and a cylindrical gap being formed between the cylindrical member and an inner wall surface of the cylindrical housing and leading to the gas discharge port,
an obstacle provided in the gap to limit a flow of gas passing axially through the gap,
a first gas passage hole and a second gas passage hole being provided on a wall surface of the cylindrical member in the ignition device side and the obstacle side, respectively,
a third gas passage hole provided on a wall surface of the cylindrical member between the diffuser portion and the obstacle,
a gas generating agent accommodated inside the cylindrical housing including the inside of the cylindrical member, and
the gas generating agent ignited and burned by actuation of the ignition device and when gas is generated, at least part of the gas flowing through the first gas passage hole into the gap, part of the gas, that has passed therethrough, flowing again into the cylindrical member through the second gas passage hole to aid the combustion of the gas generating agent, then flowing together with gas generated thereby through the third gas passage holes into the gap, and finally being discharged from the gas discharge port.

The invention (II) provides
a gas generator including:
a cylindrical housing in which an ignition device is mounted on one end side and a diffuser portion having a gas discharge port is mounted on the other end side,
a cylindrical member disposed and fixed inside the cylindrical housing, and a cylindrical gap being formed between the cylindrical member and an inner wall surface of the cylindrical housing and leading to the gas discharge port,
an obstacle provided in the gap to block a flow of gas passing axially through the gap,
a first gas passage hole and a second gas passage hole being provided on a wall surface of the cylindrical member in the ignition device side and the obstacle side, respectively,
a third gas passage hole provided on a wall surface of the cylindrical member between the diffuser portion and the obstacle,
a gas generating agent accommodated inside the cylindrical housing including the inside of the cylindrical member, and
the gas generating agent ignited and burned by actuation of the ignition device and when gas is generated, at least part of the gas flowing through the first gas passage hole into the gap, the entire gas, that has passed therethrough, flowing again into the cylindrical member through the second gas passage hole to aid the combustion of the gas generating agent, then flowing together with gas generated thereby through the third gas passage holes into the gap, and finally being discharged from the gas discharge port.

BRIEF DESCRIPTION OF THE DRAWINGS

The present invention will become more fully understood from the detailed description given hereinbelow and the accompanying drawings which are give by way of illustration only, and thus are no limitative of the present invention and wherein.

DETAILED DESCRIPTION OF THE INVENTION

Figure 1:
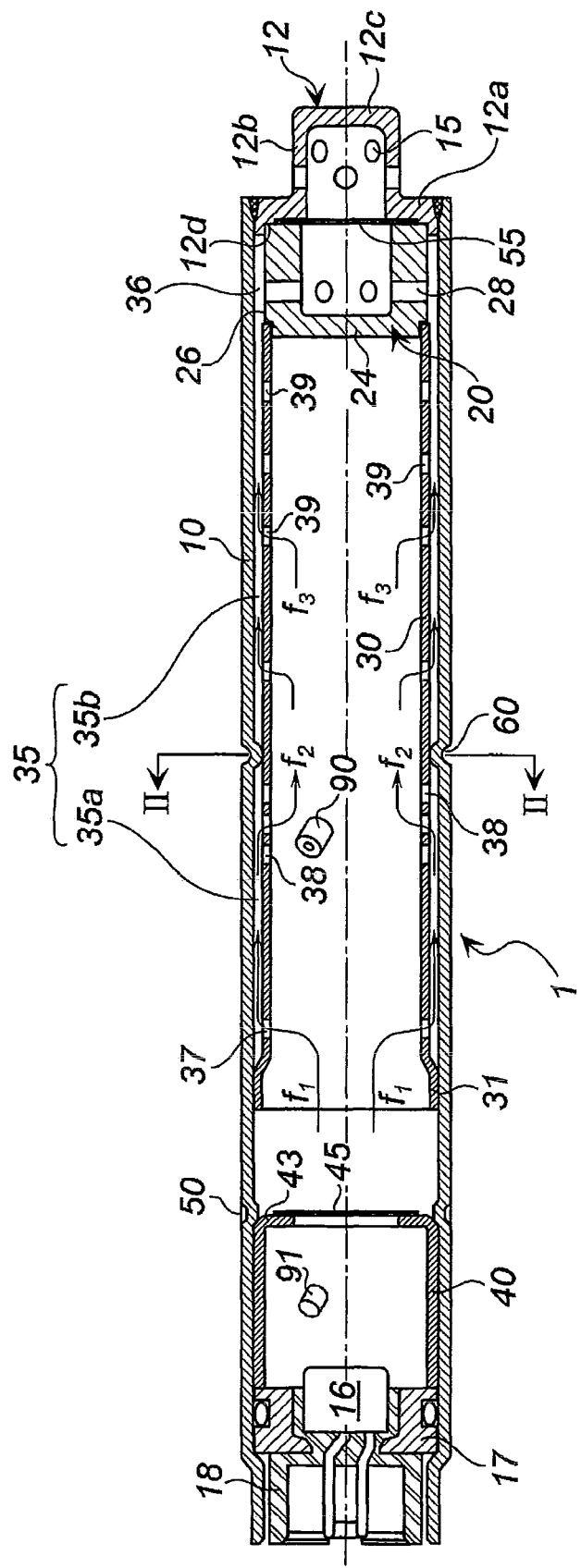
FIG. 1 shows a sectional view in the axial direction of a gas generator according to an embodiment of the present invention.

In U.S. Pat. No. 2008/0078486, when the gas generator is actuated, the gas generating material 16 on the booster 24 side is burned earlier than other portions of the gas generating material 16, and the generated gas flows to the orifice 18 through the unburned gas generating agent 16, whereby the gas flow is restricted. The resultant problem is that the pressure inside the inner housing 14 rises and it can cause a fracture of parts constituting the gas generator and also makes it difficult for the entire gas generating material 16 to burn.

Accordingly, the present invention provides a gas generator that has good ignition ability of the entire gas generating agent and facilitates gas flow, that is, has an early timing of gas discharge, despite an elongated shape.

The ignition device may include only the conventional electric igniter or a combination of the electric igniter and a conventional transfer charge or gas generating agent.

The cylindrical member has an outer diameter less than an inner diameter of the cylindrical housing, and a cylindrical gap is formed between the inner wall surface of the cylindrical housing and the outer wall surface of the cylindrical member due to the difference between the inner diameter and the outer diameter.

The length of the cylindrical member is less than the length of the cylindrical housing and may be equal to or less than a remaining length of the cylindrical housing except for the ignition device and the diffuser portion disposed at respective ends of the cylindrical housing.

A method for disposing and fixing the cylindrical member is not particularly limited. Thus, a method by which an enlarged diameter portion that has an enlarged outer diameter is formed in an opening at both ends or one end of the cylindrical member and the enlarged diameter portion is press-fitted to the inner wall surface of the cylindrical housing, or a method by which either of the ends is pressed against the other member for fitting and fixing, can be applied.

The inner space of the cylindrical member or a space formed by the cylindrical member and cylindrical housing is filled with a gas generating agent and serves as a combustion chamber. The gas generator in accordance with the present invention preferably does not use a coolant/filter for cooling and filtering the combustion gas in order to reduce the size and weight, but the coolant/filter can be used if necessary.

An obstacle is provided in the gap between the cylindrical housing and cylindrical member. This obstacle is for disturbing the smooth flow of the gas passing axially through the gap. Because the obstacle is only to disturb the smooth gas flow between the axially divided ga
thereby, the divided ga
are not completely isolate for the obstacle, but are in communication with each other in the axial direction.

Any obstacle may be used provided that the smooth gas flow in the axial direction in the gap is limited. Thus, the obstacle can be a concave portion formed from the outside to the inside of the cylindrical housing, or a convex portion formed from the inside to the outside of the cylindrical member.

In this case, the concave portion formed from the outside to the inside of the cylindrical housing may such that a distal end of the concave portion abuts against the outer wall surface of the cylindrical member, or such that the distal end is close to the outer wall surface of the cylindrical member. Likewise, the convex portion formed from the inside to the outside of the cylindrical member may be such that a distal end of the convex portion abuts against the inner wall surface of the cylindrical housing, or such that the distal end is close to the inner wall surface of the cylindrical housing. Further, a communicating gas path is formed between the distal end of the concave portion and the outer wall surface of the cylindrical member, between the distal end of the convex portion and the inner wall surface of the cylindrical housing, between the concave portions, or between the convex portions.

A first gas passage hole and a second gas passage hole, and a third gas passage hole are formed on both sides of the obstacle in the cylindrical member, respectively.

The first gas passage hole and the second gas passage hole are formed, separately from each other, in the wall surface of the cylindrical member on the ignition device side with respect to the obstacle. The first gas passage hole is formed on the wall surface of the ignition device side, and the second gas passage hole is formed on the wall surface closer than the first gas passage holes to the obstacle. The first gas passage hole and the second gas passage hole may be provided in a plurality form, respectively.

A plurality of third gas passage holes may be formed in the wall surface of the cylindrical member in the diffuser portion side with respect to the obstacle.

Among the first, second and third gas passage holes, the first gas passage hole is the closest to the ignition device, the second gas passage hole is the closest to the obstacle, and the third gas passage hole is the closest to the diffuser portion. As a result, when the gas generating agent is ignited and burned by the actuation of the ignition device and gas is generated, at least part of the gas flows through the first gas passage hole into the cylindrical gap. However, under the effect of the obstacle, smooth flow of part of the gas moving axially in the cylindrical gap is disturbed and this gas flows again into the cylindrical member partially through the second gas passage holes and aids the combustion of the gas generating agent.

Thus, part of the gas that has once flown to the outside from the inside of the cylindrical member (combustion chamber) again flows into the combustion chamber in a position that is farther from the ignition device. Therefore, the ignition and combustion ability of the gas generating agent located in the position farther from the ignition device is improved.

Further, because the ignition and combustion ability of the gas generating agent located in the position farther from the ignition device is improved, the ignition and combustion ability of the entire gas generating agent is also improved, the gas generated by the combustion of the gas generating agent flows again through the third gas passage hole into the gap, and is finally discharged from the gas discharge port.

As described hereinabove, because the combustion gas flows into and out of the cylindrical gap, the gas repeatedly comes into contact with the cylindrical member or the cylindrical housing in this process. The resultant effect is that due to such contact, the combustion gas temperature decreases and a combustion residues derived from metal components contained in the combustion gas are attached to and held on the wall surface.

Further, part of the gas flowing in the gap is caused by the obstacle to return into the combustion chamber, but the remaining gas continues flowing in the axial direction of the gap through the communicating gas paths at the obstacle and reaches the gas discharge port. Because this remaining gas is not prevented from flowing until reaching the gas discharge port, the gas discharge timing can be advanced.

In the invention (II), the obstacle function is different from that in the invention (I). Other features are the same.

The obstacle is provided in a gap between the cylindrical housing and cylindrical member and blocks the flow of gas passing axially through the gap. Because this obstacle blocks the gas flow, the gap is completely divided in the axial direction and the divided ga
are not in communication with each other in the axial direction.

Any obstacle that can block the axial gas flow through the gap may be used, and an annular member fixed to the outer wall surface of the cylindrical member can be used as the obstacle. In this case, the outer peripheral surface of the annular member abuts against the inner wall surface of the cylindrical housing.

When the gas generating agent is ignited and burned by actuation of the ignition device and gas is generated, part of the gas flows through the first gas passage hole into the gap, and the entire gas flows again into the cylindrical member through the second gas passage hole under the effect of the obstacle and aids the combustion of the gas generating agent.

Thus, the entire gas that has once flown to the outside from the inside of the cylindrical member (combustion chamber) again flows into the combustion chamber in a position that is farther from the ignition device. Therefore, the ignition and combustion ability of the gas generating agent located in the position farther from the ignition device is improved.

Further, because the ignition and combustion ability of the gas generating agent located in the position farther from the ignition device is improved, the ignition and combustion ability of the entire gas generating agent is also improved, the gas generated by the combustion of the gas generating agent flows again through the third gas passage hole into the gap, and is finally discharged from the gas discharge port.

The gas generator in accordance with the present invention is especially effective when the cylindrical housing has an axially elongated shape. The gas generator of the present invention has good ignition and combustion ability regarding the gas generating agent and good gas discharge ability, even in a case in which an (L/D) ratio of the length (L) of the cylindrical housing to the outer diameter (D) thereof is equal to or greater than 4.

The obstacle is preferably disposed as a component separate from the cylindrical housing and cylindrical member. For example, a protrusion continuous in the circumferential direction is formed, as the obstacle, on the outside of the cylindrical member and the distal end of the protrusion abuts against the inner wall surface of the cylindrical housing.

With the gas generator in accordance with the present invention, the combustion ability of the entire gas generating agent can be improved and gas discharge ability is also good even when the cylindrical housing has an axially elongated shape. Preferred Embodiments of the Invention (1) Gas generator shown in FIGS. 1 and 2

Figure 2:
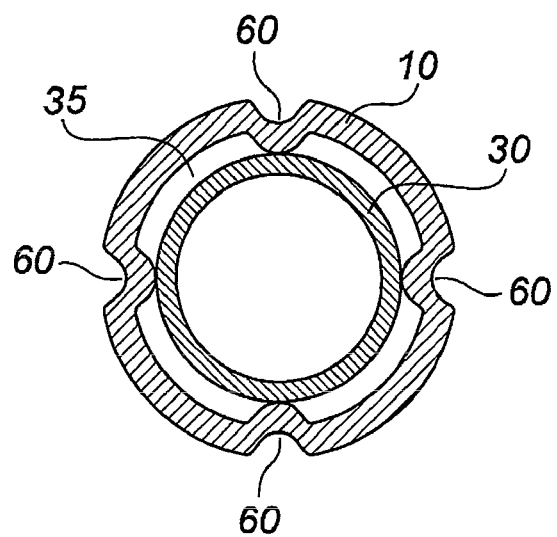
FIG. 2 shows a sectional view taken along the II-II line in FIG. 1.

An embodiment of the present invention will be explained below with reference to FIGS. 1 and 2. FIG. 1 is a sectional view in the axial direction of a gas generator 1. FIG. 2 is a sectional view cut along the II-II line in FIG. 1.

An ignition device including an igniter 16 and a first gas generating agent 91 is attached at one end of a cylindrical housing 10. The igniter 16 is fixed to the one end of the cylindrical housing 10 by a metallic igniter collar 17 and a resin 18. The cylindrical housing 10 has a ratio (L/D) of a length (L) to an outer diameter (D) of 4-8, but this range is not limited.

The gas generating agent 91 is accommodated in a space defined by a cylindrical retainer 40. An opening at one end of the cylindrical retainer 40 abuts against an igniter collar 17 and an opening at the other end is closed by a seal tape 45. An inwardly bent portion 43 is formed at the opening at the other end (which is closed with the seal tape 45) of the cylindrical retainer 40, and the cylindrical retainer 40 is immobilized, at the bent portion 43, by a protrusion 50 formed in the cylindrical housing 10.

The seal tape 45 serves to separate the first gas generating agent 91 and a second gas generating agent 90 so as to prevent them from mixing before the actuation. Therefore, instead of the seal tape 45, the same function can be imparted by the perforated member provided in the opening portion of the cylindrical retainer 40. The size of each hole in the perforated member is so as not to allow the first gas generating agent 91 to pass therethrough.

A gas generating agent that has good ignition ability and sustained combustion (high combustion temperature) can be used as the first gas generating agent 91. The combustion temperature of the first gas generating agent 91 is preferably within a range of 1700 to 3000° C., and a cylindrical configuration, which has an outer diameter of 1.5 mm and a thickness of 1.5 mm and includes nitroguanidine (34% by weight) and strontium nitrate (56% by weight) can be used as the first gas generating agent 91.

A cup-shaped diffuser portion 12 is mounted on the other end of the cylindrical housing 10. The diffuser portion 12 is fixed by welding to the cylindrical housing 10 at a flange portion 12a and has a circumferential portion 12b, in which a plurality of gas discharge ports 15 are formed, and a bottom portion 12c.

A cup-shaped member 20 is disposed inside the cylindrical housing 10 at the end portion thereof in the diffuser portion 12 side. A peripheral end of the opening of the cup-shaped member 20 is fitted to a cut-out step 12d formed in the flange portion 12a. A plurality of communication holes 28 are formed in a circumferential surface 26 of the cup-shaped member 20. The outer diameter of the cup-shaped member 20 is set to be less than the inner diameter of the cylindrical housing 10.

A seal tape 55 is attached to the opening of the cup-shaped member 20. The seal tape 55 serves to protect the second gas generating agent 90 and the first gas generating agent 91 from moisture entering through the gas discharge ports 15.

A cylindrical member 30 having an outer diameter smaller than the inner diameter of the cylindrical housing 10 is disposed inside the cylindrical housing 10.

The cylindrical member 30 has an enlarged diameter portion 31 in the igniter 16 side. The outer diameter of the enlarged diameter portion 31 prior to mounting is set slightly larger than the inner diameter of the cylindrical housing 10. Therefore, when the cylindrical member 30 is inserted into the cylindrical housing 10, the outer wall surface of the enlarged diameter portion 31 is pressed against the inner wall surface of the cylindrical housing 10. In FIG. 1, a gap is provided between the enlarged diameter portion 31 and the retainer 40 (the seal tape 45), but the enlarged diameter portion 31 and the seal tape 45 may be closer to each other, or the distal end of the enlarged diameter portion 31 may abut against the protrusion 50.

The cylindrical member 30 is provided such that the peripheral edge of the opening thereof in the diffuser portion 12 side is fitted into an annular step portion formed in the bottom portion 24 of the cup-shaped member 20. So, by the above fitting as as the pressing force created by the enlarged diameter portion 31, the cylindrical member is fixed and positioned with respect to the cylindrical housing 10(that is, being positioned so that the central axis of the housing 10 and the central axis of the cylindrical member 30 is coincident with each other).

The inside of the cylindrical member 30 and the cylindrical housing 10 is a combustion chamber filled with the second gas generating agent 90 in a single-perforated cylindrical shape. The second gas generating agent 90 is preferably selected in association with the first gas generating agent 91, and a gas generating agent having a low ignition ability and a low combustion temperature can be used therefor. The combustion temperature of the second gas generating agent 90 is desirably within a range of 1000 to 1700° C. A single-perforated cylindrical configuration, which has an outer diameter of 1.8, mm, an inner diameter of 0.7 mm, and a length of 1.9 mm and includes guanidine nitrate (41% by weight), basic copper nitrate (49% by weight) and a binder or an additive, can be used as the second gas generating agent 90.

The inner diameter of the cylindrical housing 10 is set to be larger than the outer diameter of the cylindrical member 30. Therefore, because of the difference between the inner diameter and outer diameter, a cylindrical gap 35 of equal width is formed between the inner wall surface of the cylindrical housing 10 and the outer wall surface of the cylindrical member 30. The cylindrical gap 35 is also formed between the outer wall surface of the cup-shaped member 20 and the inner wall surface of the cylindrical housing 10, and the dead end of the gap is provided at the flange 12a of the diffuser portion. A portion of the cylindrical gap 35 that becomes the dead end (portion that is closer to the diffuser portion 12 than to the communication holes 28) serves as a cylindrical pocket 36. This pocket 36 also serves to retain the residues.

As shown in FIGS. 1 and 2, four concave portions 60 that are concaved from the outside to the inside are provided in the cylindrical housing 10, and distal ends of the concave portions 60 abut against the outer wall surface of the cylindrical member 30. Because of the presence of the four concave portions 60, the radial cross section area of the cylindrical gap 35 is reduced, and the four concave portions 60 serve as obstacles for limiting a smooth flow of gas passing axially through the cylindrical gap 35.

A convex portion, which is obtained by making the circumferential wall portion of the cylindrical member 30 to protrude from the inside to the outside, can be also used instead of a concave portion 60. Another option is to use an annular member 153 such as shown in the below-described FIGS. 3 and 4, forming a gap between the annular member 153 and the inner wall surface of the cylindrical housing 10.

By increasing or decreasing the number of the concave portions 60 or adjusting the size of the concave portions 60 (the width in the circumferential direction), it is possible to increase or decrease the radial cross section area of the cylindrical gap 35. By increasing or decreasing the radial cross section area of the cylindrical gap 35, it is possible to regulate the gas flow (that is, the difficulty of flow) passing axially through the cylindrical gap 35.

In the peripheral surface of the cylindrical member 30 between the concave portions 60 and the igniter 16, a plurality of first gas passage holes 37 are formed closer to the igniter 16, and the peripheral surface that is closer to the concave portions 60 is formed with a plurality of second gas passage holes 38. The plurality of second gas passage holes 38 are preferably formed at closer positions to the concave portions 60.

A plurality of third gas passage holes 39 are formed in a wall surface of the cylindrical member 30 between the concave portions 60 and the diffuser portion 12.

Due to the presence of the concave portions 60, the cylindrical gap 35 is divided into a first cylindrical gap 35a on the igniter 16 side and a second cylindrical gap 35b on the diffuser portion 12 side. In the embodiment shown in FIG. 1, the first cylindrical gap 35a and second cylindrical gap 35b are in communication with each other as shown in FIG. 2.

In FIG. 1, the four concave portions 60 are formed only in one location in the axial direction, but the other concave portions 60 can be also formed separately in a plurality of locations in the axial direction. For example, when the four concave portions 60 are formed in each of two locations separated in the axial direction (a first group of concave portions is formed in a position close to the igniter 16, and a second group of concave portions is formed in a position farther therefrom), the cylindrical gap 35 is divided by the first group of concave portions and second group of concave portions into three cylindrical ga
in the axial direction. Further, when the aforementioned first group of concave portions and second group of concave portions are formed, a plurality of the first gas passage holes 37 and the second gas passage holes 38 are also formed between the first group of concave portions and the second group of concave portions, as in the embodiment shown in FIG. 1.

The operation of the gas generator 1 shown in FIG. 1 will be explained below. The first gas generating agent 91 is burned by the actuation of the igniter 16, the seal tape 45 is ruptured, and the combustion gas enters the inside of the cylindrical member 30.

The combustion of the second gas generating agent 90 is initiated by the combustion gas, and the combustion propagates in the axial direction. In this process, part of the combustion gas flows into the first cylindrical gap 35a (gas flow $f_1$) through the plurality of the first gas passage holes 37. Then, part of the combustion gas propagating axially inside the first cylindrical gap 35a, is forcibly caused to flow, through the plurality of second gas passage holes 38, into the cylindrical member 30 by collision with the concave portions 60 (gas flow $f_2$), thereby aiding the ignition and combustion of the second gas generating agent 90. The combustion of the entire second gas generating agent 90 is thus improved by the axial advancement of ignition and combustion of the second gas generating agent 90 inside the cylindrical member 30 and the ignition and combustion of the second gas generating agent 90 aided by the combustion gas flowing through the second gas passage holes 38.

The remaining gas that has not entered through the second gas passage holes 38 into the cylindrical member 30 flows through gas paths between the concave portions 60 and the cylindrical housing 10, and then enters directly the second cylindrical gap 35b. Because this gas reaches the diffuser portion 12 earlier, the time from the actuation to the gas discharge is short.

The gas generated by the propagation of combustion then flows from the plurality of third gas passage holes 39 into the second cylindrical gap 35b (gas flow $f_3$), passes through the communication holes 28 of the cup-shaped member 20, and is eventually discharged from the gas discharge ports 15 of the diffuser portion 12.

As described hereinabove, at least part of the combustion gas flows through the first gas passage holes 37 into the first cylindrical gap 35a and then collides with the concave portions 60, and at least part of this gas again enters the inside of the cylindrical member 30 through the second gas passage holes 38 and then enters the inside of the second cylindrical gap 35b through the third gas passage holes 39 (gas flow $f_1 \rightarrow f_2 \rightarrow f_3$). Therefore, because of the gas outflow-inflow pattern, the combustion gas repeatedly comes into contact with the inner wall surface of the cylindrical housing 10 and outer wall surface of the cylindrical member 30. The resultant effect is that due to such contact, the combustion gas temperature decreases and residues derived from metal components contained in the combustion gas are attached to and held on the wall surface.

The gas generator 1 in accordance with the present invention has the above-described structure and can perform the above-described operation. Therefore, although the gas generator has an elongated shape in the axial direction with an L/D range of 4 to 8 the combustion of the gas generating agent can proceed smoothly and the gas generator can be rapidly actuated. In particular, the problem associated with gas generators of this type is that the combustion chamber formed inside the cylindrical housing 10 also has elongated shape in the axial direction and a certain time is required for the combustion to propagate sequentially from one end of the combustion chamber to the opposite end. However, the gas generator in accordance with the present invention resolves this problem.

Figure 3:
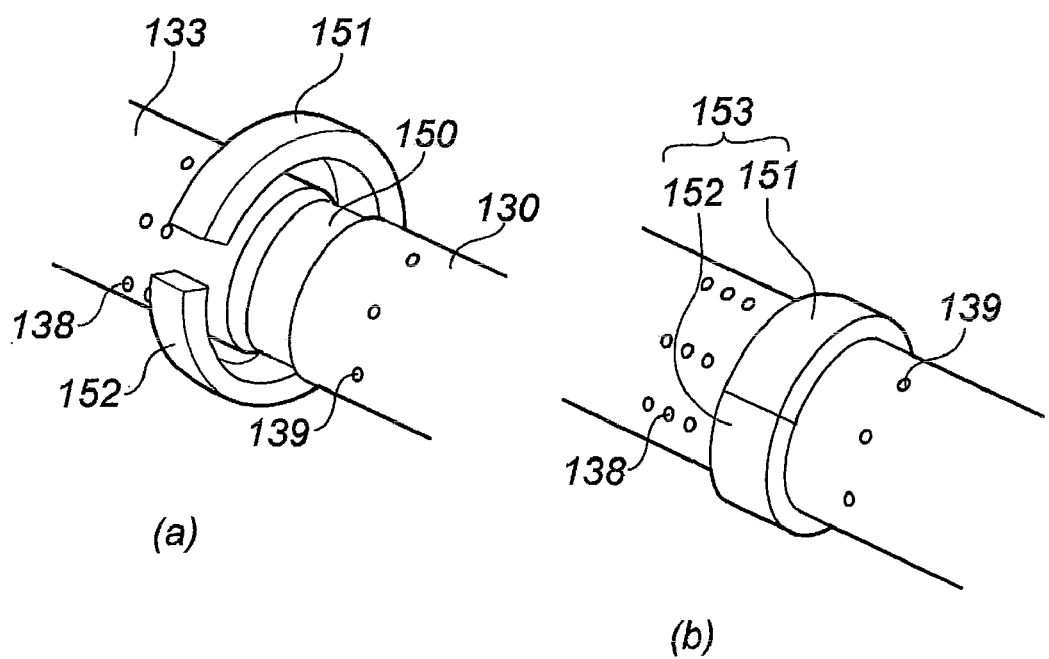
FIG. 3 includes (a) and (b) and shows explanatory drawings illustrating a method for assembling a gas generator of another embodiment of the present invention.
Figure 4:
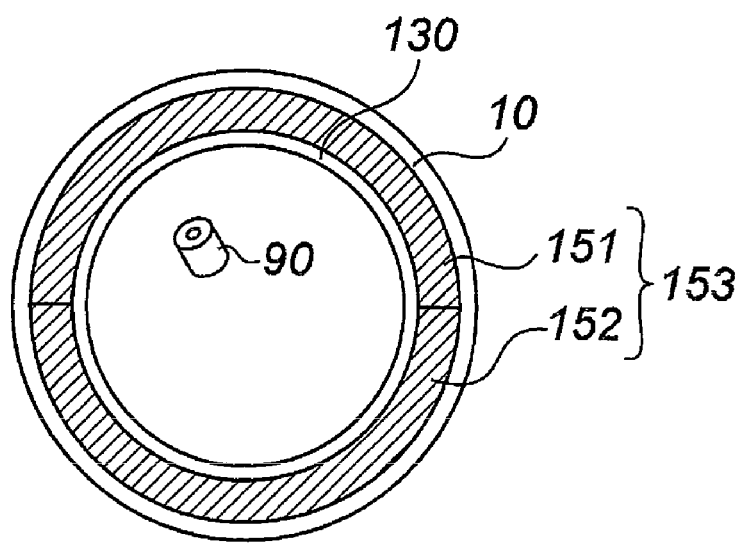
FIG. 4 shows a radial sectional view of the embodiment shown in FIG. 3(b).

(2) Gas generator shown in FIGS. 3 and 4

Another embodiment of the present invention will be described below with reference to FIGS. 3 and 4. FIG. 3 is an explanatory drawing illustrating a method for assembling the gas generator. FIG. 4 is a radial sectional view of the embodiment shown in FIG. 3. The gas generator shown in FIGS. 3 and 4 differs from the gas generator 1 shown in FIG. 1 in the shape, structure, and functions of the obstacles, but other structural elements are the same. Only different features will be described below.

As shown in FIG. 3(a), an annular groove 150 is formed in a portion of a circumferential surface 133 of a cylindrical member 130 where second gas passage holes 138 and third gas passage holes 139 are not present. As shown in FIG. 3(b), an annular member 153 formed of a first member 151 and a second member 152 that together form a ring is fitted and fixed in the annular groove 150.

FIG. 4 shows a cross-sectional view in the radial direction of the annular member 153 in a state shown in FIG. 3(b). Because the outer circumferential surface of the annular member 153 abuts against the inner wall surface of the cylindrical housing 10, the first cylindrical gap 35a and second cylindrical gap 35b in the embodiment shown in FIG. 1 are entirely separated in the axial direction. As a result, the annular member 153 serves as an obstacle for blocking the flow of gas passing axially through the cylindrical gap 35.

The operation of the gas generator 1 shown in FIG. 1 that includes the embodiment shown in FIGS. 3 and 4 will be explained below. The first gas generating agent 91 is burned by the actuation of the igniter 16, the seal tape 45 is ruptured, and the combustion gas enters the inside of the cylindrical member 30.

The combustion of the second gas generating agent 90 is initiated by the combustion gas, and the combustion propagates in the axial direction. In this process, part of the combustion gas flows through the plurality of the first gas passage holes 37 into the first cylindrical gap 35a (gas flow $f_1$). Then, the entire combustion gas propagating axially inside the first cylindrical gap 35a is blocked by the annular member 153, whereby the gas is forcibly caused to flow through the plurality of second gas passage holes 38 into the cylindrical member 30 (gas flow $f_2$), thereby aiding the ignition and combustion of the second gas generating agent 90. The combustion of the entire second gas generating agent 90 is thus improved by the axial advancement of ignition and combustion of the second gas generating agent 90 inside the cylindrical member 30 and the ignition and combustion of the second gas generating agent 90 aided by the combustion gas flowing from the second gas passage holes 38.

The gas generated by the propagation of combustion then flows through the plurality of third gas passage holes 39 into the second cylindrical gap 35b (gas flow $f_3$), passes through the communication holes 28 of the cup-shaped member 20, and is eventually discharged from the gas discharge ports 15 of the diffuser portion 12.

The gas generator 1 in accordance with the present invention that includes the aspect shown in FIGS. 3 and 4 has the above-described structure and can perform the above-described operation. Therefore, although the gas generator has an elongated shape in the axial direction with an L/D range of 4 to 8, the combustion of the gas generating agent can proceed smoothly and the gas generator can be rapidly actuated.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
   a cylindrical housing in which an ignition device is mounted on one end side and a diffuser portion having a gas discharge port is mounted on the other end side,
   a cylindrical member disposed and fixed inside the cylindrical housing, and a cylindrical gap being formed between the cylindrical member and an inner wall surface of the cylindrical housing and leading to the gas discharge port,
   an obstacle provided in the gap to limit a flow of gas passing axially through the gap,
   a first gas passage hole and a second gas passage hole being provided on a wall surface of the cylindrical member in the ignition device side and the obstacle side, respectively,
   a third gas passage hole provided on a wall surface of the cylindrical member between the diffuser portion and the obstacle,
   a gas generating agent accommodated inside the cylindrical housing including the inside of the cylindrical member, and
   the gas generating agent ignited and burned by actuation of the ignition device and when gas is generated, at least part of the gas flowing through the first gas passage hole into the gap, part of the gas, that has passed therethrough, flowing again into the cylindrical member through the second gas passage hole to aid the combustion of the gas generating agent, then flowing together with gas generated thereby through the third gas passage holes into the gap, and finally being discharged from the gas discharge port.

2. The gas generator according to claim 1, wherein the obstacle comprises a concave portion obtained by making an inner wall surface of the cylindrical housing to protrude inward or a convex portion obtained by making an outer wall surface of the cylindrical member to protrude outward, so that, by the obstacle, part of the gas that has passed through the gap flows again into the cylindrical member through the second gas passage hole and the remaining gas passes through the gap in the axial direction and is discharged from the gas discharge port.

3. A gas generator comprising:
   a cylindrical housing in which an ignition device is mounted on one end side and a diffuser portion having a gas discharge port is mounted on the other end side,
   a cylindrical member disposed and fixed inside the cylindrical housing, and a cylindrical gap being formed between the cylindrical member and an inner wall surface of the cylindrical housing and leading to the gas discharge port,
   an obstacle provided in the gap to block a flow of gas passing axially through the gap, a first gas passage hole and a second gas passage hole being provided on a wall surface of the cylindrical member in the ignition device side and the obstacle side, respectively,
   a third gas passage hole provided on a wall surface of the cylindrical member between the diffuser portion and the obstacle,
   a gas generating agent accommodated inside the cylindrical housing including the inside of the cylindrical member, and
   the gas generating agent ignited and burned by actuation of the ignition device and when gas is generated, at least part of the gas flowing through the first gas passage hole into the gap, the entire gas, that has passed therethrough, flowing again into the cylindrical member through the second gas passage hole to aid the combustion of the gas generating agent, then flowing together with gas generated thereby through the third gas passage holes into the gap, and finally being discharged from the gas discharge port.

4. The gas generator according to claim 3, wherein the obstacle comprises an annular member fixed to an outer surface of the cylindrical member.

* * * * *